United States Patent Office 2,994,671
Patented Aug. 1, 1961

2,994,671
COATING LINEAR CONDENSATION POLYMERS WITH A POLYISOCYANATE ADDUCT
Walter L. Thompson, Ayden, N.C., assignor to E. I. du Pont de Nemours and Company, Wilmington, Del., a corporation of Delaware
No Drawing. Filed Oct. 17, 1956, Ser. No. 616,364
4 Claims. (Cl. 260—17)

This invention relates to adhesives for bonding filaments, cords, fabrics, films, and other shaped structures of synthetic linear condensation polymers to articles composed of natural or synthetic rubbers. More particularly the invention relates to shaped structures of synthetic linear condensation polymers coated with the adhesives, and to processes for applying and drying the adhesives upon the shaped structures preparatory to bonding the shaped structures to articles of natural or synthetic rubber.

Cords or fabrics are incorporated as reinforcing materials in many articles manufactured from rubber. Since filaments of synthetic linear condensation polymers have exceptional strength and resistance to flexing, their use for reinforcement of rubber articles has been highly desired. However, the adhesion of the synthetic linear condensation polymers to rubber is uniformly poor, with the result that their practical value for reinforcement is quite low in the absence of adhesives. Moreover, most of the commercial adhesives are relatively ineffective in bonding rubber with the synthetic linear condensation polymers, particularly with polyethylene terephthalate cords and fabrics. For commercial acceptability it is also highly desired that the adhesives be applied to the cords or fabrics in an aqueous dispersion rather than in an organic solvent and that the adhesive bond in the vulcanized rubber article be highly resistant to water.

It is an object of this invention to provide shaped structures of synthetic linear condensation polymers coated with an adhesive composition; said coated shaped structures, when embedded in rubber articles, being adapted to provide tenaciously adhering reinforcement for the rubber articles following vulcanization. Other objects of the invention are to provide processes for coating the shaped structure with an effective adhesive composition, and drying the adhesive composition upon the shaped structure. Additional objects will be apparent from the following description and claims.

These objects are accomplished by the present invention, which comprises the process of coating a shaped structure of a linear condensation polymer with an aqueous dispersion containing (A) a water-soluble organic polymer; (B) a vulcanizable organic polymer; and (C) a compound having the formula $Ar(NHCOX)_n$, where Ar is an organic residue containing at least one aromatic nucleus and X is a radical which satisfies the condition that the compound HX has a dissociation exponent pK in the range 7.0 to 14.0, the (NHCOX) groups being attached to an aromatic nucleus and $n$ being at least 2. The shaped structure is then dried to remove the moisture and other volatile materials. The drying step is preferably carried out by heating the coated shaped structure at 100–230° C. for a length of time sufficient to cure the adhesive coating to the shaped structure. The shaped structure itself may be any cord, fabric, film, or other structure composed of a synthetic linear condensation polymer. Preferably these structures have one dimension relatively very small and one relatively very large.

Surprisingly, coated shaped structures prepared in accordance with the present invention have been found to be highly suitable for reinforcement of natural or synthetic rubber articles. The coated shaped structures may be incorporated into a body of vulcanizable rubber material and the assembly thereafter vulcanized by means of heat and pressure. In other cases it may be desired to prepare sheets of vulcanized rubber backed with coated fabrics or films of the synthetic linear condensation polymer. The reinforced articles are found to have excellent strength and wear life, as contrasted to the poor performance of articles reinforced with untreated shaped structures caused by premature separation of the shaped structures from the rubber.

The following discussion and examples will serve to illustrate the invention in both its general and preferred embodiments.

A. THE WATER-SOLUBLE ORGANIC POLYMER

The presence of a water-soluble organic polymer in the aqueous coating composition is essential for promoting adhesion between the shaped structure and the rubber article. A preferred embodiment of the water-soluble organic polymer is a water-soluble salt of alginic acid, such as sodium or ammonium alginate. Other water-soluble polymers which may be used include polyacrylamide, sodium polyacrylate, and methyl cellulose. The concentration of water-soluble organic polymer in the coating composition is critical: when less than about 0.3% by weight is used, based on the total weight of the aqueous mixture, the coating composition does not promote adhesion. On the other hand, concentrations of water-soluble organic polymer in excess of about 3% are not required for good adhesion and in some cases higher concentrations may lead to coating compositions of undesirably high viscosity.

Surprisingly, when aqueous coating compositions containing water-soluble organic polymers are employed for adhering cords of synthetic linear condensation polymer to rubber, the flex life of the cords embedded in the rubber has been found to be very high. Previously, when adhesives dissolved in organic solvents have been employed to coat cords of synthetic linear condensation polymers, the cords have been found to be stiff and the tenacity of the cords has been found to decrease rapidly when the rubber articles in which the cords are embedded are flexed.

B. THE VULCANIZABLE ORGANIC POLYMER

Another essential component of the aqueous coating composition is a vulcanizable organic polymer; i.e., an organic polymeric material which contains residual unsaturation. The vulcanizable organic polymer is usually added in the form of a latex, or aqueous dispersion, which may include other usual ingredients such as vulcanizing agents, accelerators, antioxidants, emulsifiers, and other modifying agents. A preferred embodiment according to the present invention is a latex containing a copolymer of butadiene with at least one monomer which has both aliphatic and aromatic unsaturation. Preferred species include butadiene/styrene, butadiene/vinylpyridine, and butadiene/styrene/vinylpyridine copolymers. For acceptable adhesion the coating composition should contain at least about 1% by weight of the vulcanizable organic polymer. The concentration of the polymer in the coating composition may range up to about 15% by weight as a maximum value.

The degree of adhesion afforded by the coating composition will vary to some degree depending on the particular rubber stock to which the synthetic linear condensation polymer shaped structure is bonded. Rubber stocks containing neoprene or "GR–S" rubber (butadiene-styrene synthetic rubber) are found in general to give good adhesion with the coating compositions of this invention. In certain instances, such as when bonding to pure natural rubber stock is desired, the degree of adhesion will be enhanced by using a mixture of vulcanizable organic polymer latexes. For example, equal portions of butadiene/styrene and butadiene/styrene/vinylpyridine latexes may be used, or equal portions of natural rubber latex and butadiene/styrene/vinylpyridine.

C. THE POLYISOCYANATE ADDUCT

The third essential component of the coating composition is an adduct of an aromatic polyisocyanate and an active hydrogen compound. Compounds effective for use in the coating composition have the general formula Ar(NHCOX)$_n$, where Ar is an organic residue containing at least one aromatic nucleus and X is a radical which satisfies the condition that the compound HX has a dissociation exponent pK in the range 7.0 to 14.0, the (NHCOX) groups being attached to aromatic carbon atoms and $n$ being at least 2. The dissociation exponent pK of a compound HX is a measure of the degree of dissociation of the compound HX in dilute solution in pure water; it may be calculated from the relationship $$pK = -\log_{10} K = -\log_{10} \frac{[H^+][X^-]}{[HX]}$$

in which the respective molar concentration of each species is to be substituted in the brackets. It has been found that, for the purposes of the present invention, the dissociation exponent pK is a convenient measure of the reactivity of the polyisocyanate adduct in the coating composition. Preferred embodiments of the radical X according to the present invention include the aryloxy radicals, such as the phenyloxy radical (pK=9.9 for phenol); the arylthio radicals, such as the phenylthio radical (pK=8.3 for thiophenol); and the iminoxy radicals, such as the 2-propyleneiminoxy radical (pK=10.3 for acetoxime). Radicals for which the compound HX has a pK value in excess of about 14.0 are usually unsuitable since the compound Ar(NHCOX)$_n$ as defined above is frequently insufficiently reactive to promote satisfactory adhesion. On the other hand, radicals for which the compound HX has a pK value below about 7.0 are also frequently unsuitable, since the compound Ar(NHCOX)$_n$ may be insufficiently stable in aqueous solution.

The radical Ar may be any organic residue containing at least one aromatic nucleus. Examples of suitable polyisocyanate adducts are illustrated in Formulas I through VI below, where X is a radical as defined above.

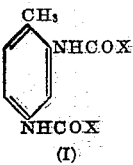
(I)

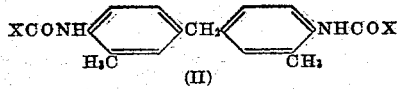
(II)

(III)

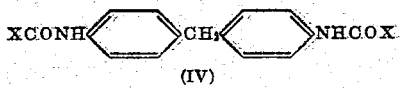
(IV)

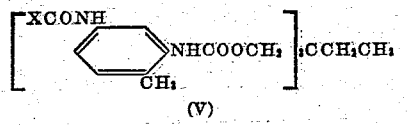
(V)

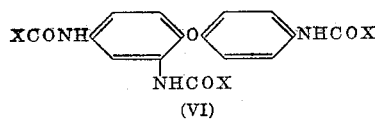
(VI)

In a preferred embodiment of the present invention the compound Ar(NHCOX)$_n$ has at least two of the (NHCOX) groups attached to aromatic carbon atoms in such positions that the aromatic nucleus has no substituents ortho- to an (NHCOX) group. Such compounds are exemplified by Formulas III, IV, V, and VI. Surprisingly, when it is desired to treat the coated shaped structures at high temperatures prior to embedding the shaped structures in rubber articles, the polyisocyanate adducts in which at least two of the (NHCOX) groups have no ortho substituents are highly superior in promoting adhesion. Such high temperature treatment is frequently desired in preparing synthetic linear condensation polymer cords for use in reinforcing V-belts and tires, since the cords are stretched about 1 to 10% at temperatures up to 230° C. and it is desired to utilize this brief heating step to dry or cure the coating on the cords. Stretching the coated cord in this manner does not reduce the adhesive value of the coating.

Although it is necessary that the radical X in at least two of the (NHCOX) groups satisfy the condition that the compound HX have a dissociation exponent pK in the range 7.0 to 14.0, groups which do not satisfy this condition may also be present in the compounds. Such a compound is exemplified by Formula V, which contains three —NHCOOCH$_2$— linkages in addition to three (NHCOX) groups. The preparation of a compound having this formula, where X=OC$_6$H$_5$, is described in Example 10.

The ratio of the amount of polyisocyanate adduct to the amount of vulcanizable organic polymer is critical. When the coating composition contains less than about 0.05 gram-mol of the polyisocyanate adduct per 100 grams of solids in the vulcanizable organic polymer latex, the adhesion of the coated shaped structure to the rubber article is quite low. On the other hand, when the coating composition contains more than about 2.5 gram-mols of the polyisocyanate adduct per 100 grams of solids in the latex the adhesion is again quite low. The optimum range, producing the highest adhesion values, is between about 0.1 and about 1.0 gram-mol of polyisocyanate adduct per 100 grams of solids in the vulcanizable organic polymer latex. Mixtures of two or more polyisocyanate adducts having a total molar concentration within the stated limits may be used, if desired.

D. OPTIONAL INGREDIENTS OF THE COATING COMPOSITION

In some cases it may be desired to incorporate additional ingredients into the coating composition. For example, the use of a dispersisng agent may be desirable if it is found that particular mixture tends to separate into two phases after standing. The addition of a dispersing agent may be especially advantageous if the particle size of solids in the mixture is quite small. Various commercially available dispersing agents of the sodium sulfonate type have been found to be satisfactory, such as the dioctyl ester of sodium sulfosuccinate.

A moderate increase in the adhesion afforded by the coating composition can sometimes be achieved by the addition of an amine, preferably one which has a relatively high boiling point. Optimum results are achieved when the vulcanizable organic polymer has amine groups incorporated within the polymer, an example being a copolymer of 2-vinylpyridine and butadiene. When the vulcanizable organic polymer does not contain amine groups, an amine such as quinoline may be included in the coating composition in amounts on the order of about 0.1% by weight, if desired. Preferably a tertiary aliphatic amine, such as tributylamine, is used.

Example 1

A solution of 209 parts of phenol (2.2 mols) in 209 parts of benzene is added to a mixture of 250 parts of diphenylmethane-4,4'-diisocyanate (1.0 mol), 250 parts of benzene, and 10 parts of pyridine. The mixture is stirred until it becomes quite thick, whereupon an additional 180 parts of benzene is added and stirring is continued overnight. The resulting product, the bis-phenylurethane of diphenylmethane-4,4'-diisocyanate, is filtered off and washed repeatedly with benzene. The yield is virtually quantitative.

Table I illustrates the results which may be obtained by preparing a series of adhesive formulations based on the urethane and coating polyethylene terephthalate cord with the formulation. To 480 parts of water is added the number of parts of the urethane indicated in the table, together with the indicated number of parts of the dioctyl ester of sodium sulfosuccinate, and the aqueous mixture is ball-milled to produce a fine dispersion of the urethane in water. To this is added the indicated number of parts of a 40% dispersion of butadiene/styrene/2-vinylpyridine (70/15/15) latex in water and the indicated number of parts of sodium alginate. A polyethylene terephthalate cord having an overall denier of approximately 1900, formed by plying together four 220-denier yarns and cabling together two of the plied strands, is passed through the mixture and the coated cord is passed directly into a heating chamber wherein a temperature of 220° C. is applied for one minute, during which time the cord is subjected to a 5% stretch. The pickup of the adhesive mixture on the cord is about 5% of the weight of the cord, measured after the heating step. The treated cord is then placed on a 5/32-inch thickness of unvulcanized rubber stock comprising 40 parts of natural rubber, 40 parts of reclaimed rubber, and 40 parts of "GR-S" rubber (butadiene-styrene synthetic rubber), backed with cotton duck. The cord is then vulcanized to the rubber stock by heating at 144° C. for 45 minutes under high pressure, whereupon it becomes embedded in the surface of the rubber. The bond of the cord to the rubber is then measured by stripping the cord from the rubber at the rate of 2 inches per minute on a commercial testing apparatus ("Instron" tester) and recording the average force required to cause this separation. The force required in each case is given in the table. The lower limit for acceptable adhesion in this test is about 1.5 pounds for 1900-denier cord. Values in the range 4 to 8 pounds are regarded as good to excellent.

As shown in the table, the highest adhesion values are obtained when the number of gram-mols of the urethane per 100 grams of solid in the latex is in the range 0.1 to 1.0. Omission of either the urethane or the latex causes the adhesion to fall to very low values. Omission of the sodium alginate also results in very poor adhesion.

Example 2

A polyhexamethylene adipamide cord having a denier of approximately 1750, formed by twisting two 840-denier strands, is passed through the mixture shown as entry 3 in Table I. The coated cord is passed directly into a heating chamber wherein a temperature of 210° C. is applied for one minute while the cord is held under 8 pounds tension. The pickup of the adhesive mixture on the cord is 9% of the weight of the cord, measured after the heating step. When the cord is bonded to rubber stock, following the procedure described in Example 1, it is found that a force of 4.5 pounds is required to separate the cord from the vulcanized rubber. When an uncoated polyhexamethylene adipamide cord is bonded to rubber in the same manner, a force of only 0.3 pound suffices to separate the cord from the vulcanized rubber.

TABLE I.—ADHESIVE FORMULATIONS—PARTS OF EACH COMPONENT PER 480 PARTS WATER

| | Urethane | 40% Latex | g.-Mols. Urethane per 100 g. Solids in Latex | Dioctyl Sodium Sulfosuccinate | Sodium Alginate | Force Required To Separate Cord From Rubber, lbs. |
|---|---|---|---|---|---|---|
| 1 | None | 50 | 0.0 | 3.75 | 5 | 0.4 |
| 2 | 38.4 | 221 | 0.0995 | 1.9 | 7.4 | 3.8 |
| 3 | 91 | 259 | 0.201 | 4.5 | 8 | 4.9 |
| 4 | 75 | 100 | 0.428 | 3.75 | 5 | 6.8 |
| 5 | 75 | 50 | 0.855 | 3.75 | 5 | 7.1 |
| 6 | 75 | 25 | 1.71 | 3.75 | 5 | 2 |
| 7 | 75 | 12.5 | 3.42 | 3.75 | 5 | 0.5 |
| 8 | 75 | None | | 3.75 | 5 | 0.3 |
| 9 | 75 | 50 | 0.855 | 3.75 | None | 0.4 |
| 10 | None | None | | None | None | 0.2 |

Example 3

A strip of polyethylene terephthalate film, 3 inches wide and 2 mils thick, is coated with the mixture shown as entry 3 in Table I. The film is dried at 200° C. for one minute, the pickup of the adhesive mixture being 5% on the weight of the film, measured after the heating step. The coated film is then placed on a 1/16-inch thickness of unvulcanized rubber stock comprising 40 parts of natural rubber, 40 parts of reclaimed rubber, and 40 parts of "GR-S" rubber. The coated film is then vulcanized to the rubber stock by heating at 144° C. for 45 minutes under high pressure. After vulcanization an attempt is made to strip the film from the rubber backing; however, the rubber backing itself breaks apart before the adhesive bond between the rubber and the film yields. When uncoated film is bonded to rubber in the same manner, the film is easily stripped from the rubber by hand.

A polyethylene terephthalate fabric prepared by plying six 1100-denier yarns for the warp and three 1100-denier yarns for the filling and weaving in a 16 x 16 ends per inch fabric construction is coated with the mixture shown as entry 3 in Table I. The fabric is dried at 110° C. for 60 minutes, the pickup of the adhesive mixture being 4% on the weight of the fabric, measured after the heating step. The coated fabric is then placed on a 5/32-inch thickness of unvulcanized rubber stock comprising 40 parts of natural rubber, 40 parts of reclaimed rubber, and 40 parts of "GR-S" rubber. The coated fabric is then vulcanized to the rubber stock by heating at 144° C. for 45 minutes at high pressure. After vulcanization the fabric is stripped from the rubber backing, a force of 50 pounds per inch of fabric width being required to accomplish this separation. When uncoated fabric is bonded to rubber stock in the same manner, a force of only 3.7 pounds per inch of fabric suffices to cause separation of the fabric from the rubber.

When the vulcanized structure of coated fabric and rubber stock is soaked in water for two weeks, the force required to strip the fabric from the rubber remains unchanged (50 pounds per inch).

Example 4

A 1900-denier polyethylene terephthalate cord is passed through the mixture shown as entry 4 in Table I. The coated cord is heated at 220° C. for one minute, during which time the cord is subjected to a 5% stretch. The pickup of the adhesive mixture on the cord is 5% of the weight of the cord, measured after the heating step. Lengths of cord are then embedded along the outside of a tube (parallel to the axis of the tube) of rubber stock comprising 40 parts of natural rubber, 40 parts of reclaimed rubber and 40 parts of "GR-S" rubber; the tube has an outside diameter of about 1 1/8 inch and an inside diameter of about 1/2 inch. The tube is then vulcanized by heating it at 145° C. for 40 minutes under pressure. A ten-inch length of the tube containing the embedded cords is then bent through a 90° angle; one end of the tube is forced onto a nipple which is free to rotate, and the other end of the tube is forced onto a nipple adapted to be rotatably driven about an axis perpendicular to the axis of rotation of the first nipple. The tube is then subjected to flexing by rotating the driven nipple at the rate of 1500 r.p.m. for an 8-hour period, the inside of the tube being maintained under an air pressure of 15 pounds per square inch during this period. At the end of the period the cords are stripped from the rubber tube, a force of 3.7 pounds being required to cause this separation as compared to a force of 4.5 pounds required to cause separation before the tube is subjected to continuous flexing. The tenacity of the cords which have been subjected to this continuous flexing is found to be 85% of the original tenacity of the cords.

*Example 5*

To 500 parts of water are added 100 parts of the bisphenylurethane of diphenylmethane-4,4'-diisocyanate, prepared as described in Example 1, and 7.5 parts of the dioctyl ester of sodium sulfosuccinate. The aqueous mixture is ball-milled to produce a fine dispersion of the urethane in water. To this is added 8.0 parts of sodium alginate and 340 parts of 29% butadiene/styrene (70/30) latex. A 1900-denier polyethylene terephthalate cord is passed through the mixture and the coated cord is heated to 220° C. for one minute while the cord is being stretched 5%. The pickup of adhesive material, measured after the heating step, is 9%. When the cord is bonded to rubber stock, as described in Example 1, it is found that a force of 1.6 pounds is required to separate the cord from the vulcanized rubber.

The experiment is repeated, except that 10 parts of quinoline are added to the coating composition. The pickup of adhesive material is 8.6%, and a force of 1.9 pounds is required to separate the cord from the vulcanized rubber.

The experiment is repeated again, except that 10 parts of tri-n-butyl amine are added to the coating composition in place of the quinoline. The pickup of adhesive material is 8.6%, and a force of 2.5 pounds is required to separate the cord from the vulcanized rubber.

*Example 6*

To 250 parts of water are added 50 parts of the bisphenylurethane of diphenylmethane-4,4'-diisocyanate, prepared as described in Example 1, and 3.75 parts of the dioctyl ester of sodium sulfosuccinate. The aqueous mixture is ball-milled to produce a fine dispersion of the urethane in water. To this is added 2.2 parts of sodium alginate and 140 parts of 40% butadiene/2-vinylpyridine (85/15) latex. A 1900-denier polyethylene terephthalate cord is passed through the mixture and the coated cord is heated at 220° C. for one minute while the cord is being stretched 5%. The pickup of adhesive material, measured after the heating step, is 6%. When the cord is bonded to rubber stock, as described in Example 1, it is found that a force of 4.5 pounds is required to separate the cord from the vulcanized rubber.

*Example 7*

To 500 parts of water are added 100 parts of the bisphenylurethane of diphenylmethane-4,4'-diisocyanate prepared as described in Example 1, and 7.5 parts of the dioctyl ester of sodium sulfosuccinate. The aqueous mixture is ball-milled to produce a fine dispersion of the urethane in water. To this is added 250 parts of 40% butadiene/styrene/2-vinylpyridine (70/15/15) latex and 17 parts of polyacrylamide (1.94% by weight of the total mixture). A 1900-denier polyethylene terephthalate cord is passed through the mixture and the coated cord is heated at 220° C. for one minute while the cord is being stretched 5%. The pickup of adhesive material, measured after the heating step, is 6%. When the cord is bonded to rubber stock, as described in Example 1, it is found that a force of 4.3 pounds is required to separate the cord from the vulcanized rubber.

The experiment is repeated, except that the polyacrylamide is replaced with 8.5 parts of sodium polyacrylate (0.98% by weight of the total mixture). The pickup of adhesive material is 8%, and a force of 3.1 pounds is required to separate the cord from the vulcanized rubber.

The experiment is repeated again, except that the polyacrylamide is replaced with 8.5 parts of methyl celluloseacrylamide (0.98% by weight of the total mixture). The pickup of adhesive material is 8%, and a force of 2.3 pounds is required to separate the cord from the vulcanized rubber.

*Example 8*

A solution of 161 parts of acetoxime (2.2 mols) in 161 parts of benzene is added to a mixture of 250 parts of diphenylmethane-4,4'-diisocyanate (1.0 mol), 250 parts of benzene, and 10 parts of pyridine. The mixture is stirred until it becomes quite thick, whereupon an additional 150 parts of benzene is added and stirring is continued overnight. The resulting adduct is filtered off and washed repeatedly with benzene, the yield being virtually quantitative.

To 350 parts of water is added 29 parts of the adduct of the oxime and the diisocyanate, and the aqueous mixture is ball-milled to produce a coarse dispersion of the adduct in water. To this is added 2 parts of sodium alginate and 90 parts of 40% butadiene/styrene/2-vinylpyridine (70/15/15) latex. A 1900-denier polyethylene terephthalate cord is passed through the mixture and the coated cord is heated at 220° C. for one minute while the cord is being stretched 5%. The pickup of adhesive material, measured after the heating step, is 3%. When the cord is bonded to rubber stock, as described in Example 1, it is found that a force of 5.1 pounds is required to separate the cord from the vulcanized rubber.

*Example 9*

A solution of 242 parts of thiophenol (2.2 mols) in 242 parts of benzene is added to a mixture of 250 parts of diphenylmethane-4,4'-diisocyanate (1.0 mol), 250 parts of benzene, and 10 parts of pyridine. The mixture is stirred until it becomes quite thick, whereupon an additional 300 parts of benzene is added and stirring is continued overnight. The resulting thiourethane is filtered off and washed repeatedly with benzene, the yield being virtually quantitative.

To 300 parts of water is added 65 parts of the thiourethane derived from the thiophenol and the diisocyanate, and the aqueous mixture is ball-milled to produce a coarse dispersion of the thiourethane in water. To this is added 4 parts of sodium alginate and 160 parts of 40% butadiene/styrene/2 - vinylpyridine (70/15/15) latex. A 1900-denier polyethylene terephthalate cord is passed through the mixture and the coated cord is heated at 220° C. for one minute while the cord is being stretched 5%. The pickup of adhesive material, measured after the heating step, is 6%. When the cord is bonded to rubber stock, as described in Example 1, it is found that a force of 4.5 pounds is required to separate the cord from the vulcanized rubber.

*Example 10*

A solution of 94 parts of phenol (1.0 mol) in 94 parts of benzene is added slowly to a mixture of 348 parts of toluene-2,4-diisocyanate (2.0 mols), 1000 parts of benzene, and 10 parts of pyridine. The solution is stirred overnight and the resulting monoadduct of phenol and toluene-2,4-diisocyanate is filtered off and washed repeatedly with benzene. 241 parts of the adduct (0.9 mol) is dissolved in an equal amount of diethyl ketone and the resulting solution is added to a solution of 40.3 parts of 1,1,1-trimethylolpropane (0.3 mol) in an equal quantity of diethyl ketone. The mixture is stirred at 50° C. overnight, after which the diethyl ketone is evaporated off.

A mixture of 42 parts of the resulting solid and 292 parts of water is ball-milled to produce a coarse dispersion of the solid in water. To this is added 4.2 parts of sodium alginate and 38 parts of 40% butadiene/styrene/2-vinylpyridine latex (70/15/15). A 1900 denier polyethylene terephthalate cord is passed through the mixture and the coated cord is heated at 220° C. for one minute while a 5% stretch is applied to the yarn. The pickup of adhesive material on the yarn, measured after the heating step, is 5%. When the cord is vulcanized to rubber stock, as described in Example 1, a force of 3.2 pounds is required to separate the cord from the rubber.

*Example 11*

A solution of 209 parts of phenol (2.2 mols) in an equal quantity of benzene is added to a mixture of 160 parts of m-benzenediisocyanate (1.0 mol), 160 parts of benzene, and 10 parts of pyridine. The mixture is stirred until it becomes quite thick, whereupon an additional 180 parts of benzene is added and stirring is continued overnight. The resulting product, the bisphenylurethane of m-benzene-diisocyanate, is filtered off and washed repeatedly with benzene. The yield is virtually quantitative.

To 350 parts of water is added 30 parts of the urethane and the aqueous mixture is ball-milled to produce a coarse dispersion of the urethane in water. To this is added 5 parts of sodium alginate and 100 parts of 40% butadiene/styrene/2-vinylpyridine (70/15/15) latex. A 1900-denier polyethylene terephthalate cord is passed through the mixture and the coated cord is heated at 220° C. for one minute while the cord is being stretched 5%. The pickup of adhesive material, measured after the heating step, is 5%. When the cord is bonded to rubber stock, as described in Example 1, it is found that a force of 2.8 pounds is required to separate the cord from the vulcanized rubber.

*Example 12*

A solution of 283 parts of phenol (3.0 mols) in an equal amount of benzene is added to a mixture of 293 parts of (diphenyl ether)-2,4,4'-triisocyanate (1.0 mol), 293 parts of benzene, and 10 parts of pyridine. The mixture is stirred overnight, following which the solvent is evaporated from the product, a triphenylurethane.

To 160 parts of water is added 11 parts of the urethane and 5 parts of a commercial sodium sulfonate dispersing agent (identified as Triton X-200), and the aqueous mixture is ball-milled to produce a fine dispersion of the urethane in water. To this is added 1.7 parts of sodium alginate and 35 parts of 40% butadiene/styrene/2-vinylpyridine (70/15/15) latex. A 1900-denier polyethylene terephthalate cord is passed through the mixture and the coated cord is heated at 220° C. for one minute while the cord is being stretched 5%. The pickup of adhesive material, measured after the heating step, is 7%. When the cord is bonded to rubber stock, as described in Example 1, it is found that a force of 5.3 pounds is required to separate the cord from the vulcanized rubber.

*Example 13*

A solution of 209 parts of phenol (2.2 mols) in 209 parts of benzene is added to a mixture of 174 parts of toluene-2,4-diisocyanate (1.0 mol), 174 parts of benzene, and 10 parts of pyridine. The mixture is stirred until it becomes quite thick, whereupon an additional 180 parts of benzene is added and stirring is continued overnight. The resulting product, the bis-phenylurethane of toluene-2,4-diisocyanate, is filtered off and washed repeatedly with benzene. The yield is virtually quantitative.

To 480 parts of water are added 96 parts of the urethane and 7.2 parts of the dioctyl ester of sodium sulfonate, following which the aqueous mixture is ball-milled to produce a fine dispersion of the urethane in water. To this is added 3.9 parts of sodium alginate and 212 parts of 40% butadiene/styrene/2-vinylpyridine latex (70/15/15).

The mixture is used to coat a polyethylene terephthalate fabric prepared by plying six 1100-denier yarns for the warp and three 1100-denier yarns for the filling and weaving in a 16 x 16 ends per inch fabric construction. The coated fabric is heated for 10 minutes at 150° C. The pickup of adhesive material, measured after the heating step, is 4%. The coated fabric is bonded to rubber stock as described in Example 3. The force required to strip the fabric from the rubber is 30 pounds per inch of fabric width, as compared to only 3.7 pounds required to strip uncoated fabric bonded to rubber in the same manner.

When the coated fabric is heated for 60 minutes at 150° C. prior to bonding it to rubber, a force of 35 pounds per inch of fabric width is required to strip the fabric from the rubber.

It will be apparent that many widely different embodiments of this invention may be made without departing from the spirit and scope thereof, and therefore it is not intended to be limited except as indicated in the appended claims.

I claim:

1. The process which comprises coating a shaped structure composed of a linear condensation polymer with an adhesive composition comprising an aqueous dispersion containing (A) at least about 0.3% by weight of a water-soluble organic polymer selected from the group consisting of a water-soluble salt of alginic acid, polyacrylamide, sodium polyacrylate, and methyl cellulose, (B) from about 1% to about 15% by weight of a vulcanizable organic polymer, and (C) a compound having the formula $$Ar(NHCOX)_n$$

in which Ar is an organic residue containing at least one aromatic nucleus, X is a radical selected from the group consisting of aryloxy, arylthio, and iminoxy, and n is at least two, said compound being present in said aqueous dispersion in the ratio of from about 0.05 gram mol to about 2.5 gram mols per 100 grams of said vulcanizable organic polymer, and thereafter drying said coating.

2. An adhesive composition comprising an aqueous dispersion containing (A) at least about 0.3% by weight of a water-soluble organic polymer selected from the group consisting of a water-soluble salt of alginic acid, polyacrylamide, sodium polyacrylate, and methyl cellulose, (B) from about 1% to about 15% by weight of a vulcanizable organic polymer, and (C) a compound having the formula $$Ar(NHCOX)_n$$

in which Ar is an organic residue containing at least one aromatic nucleus, X is a radical selected from the group consisting of aryloxy, arylthio, and iminoxy, and n is at least two, said compound being present in said aqueous dispersion in the ratio of from about 0.05 gram mol to about 2.5 gram mols per 100 grams of said vulcanizable organic polymer.

3. The process which comprises coating a shaped structure composed of a linear condensation polymer with an adhesive composition comprising an aqueous dispersion containing (A) at least about 0.3% to about 3% by weight of a water-soluble organic polymer selected from the group consisting of a water-soluble salt of alginic acid, polyacrylamide, sodium polyacrylate, and methyl cellulose, (B) from about 1% to about 15% by weight of a vulcanizable organic polymer selected from the group consisting of a butadiene/styrene copolymer, a butadiene/vinylpyridine copolymer and a butadiene/styrene/vinylpyridine copolymer, and (C) a compound having the formula $$Ar(NHCOX)_n$$

in which Ar is an organic residue containing at least one aromatic nucleus, X is a radical selected from the group consisting of aryloxy, arylthio, and iminoxy, and n is at least two, at least two of the (NHCOX) groups being attached to aromatic nucleus carbon atoms in such positions that the aromatic nucleus has no substituents ortho- to an (NHCOX) group, said compound being present in said aqueous dispersion in the ratio of from about 0.05 gram mol to about 2.5 gram mols per 100 grams of said vulcanizable organic polymer, and thereafter drying said coating.

4. An adhesive composition comprising an aqueous dispersion containing (A) at least about 0.3% to about 3% by weight of a water-soluble organic polymer selected from the group consisting of a water-soluble salt of alginic acid, polyacrylamide, sodium polyacrylate, and methyl cellulose, (B) from about 1% to about 15% by weight of a vulcanizable organic polymer selected from the group consisting of a butadiene/styrene copolymer, a butadiene/vinylpyridine copolymer, and a butadiene/styrene/vinylpyridine copolymer, and (C) a compound having the formula $$Ar(NHCOX)_n$$

in which Ar is an organic residue containing at least one aromatic nucleus, X is a radical selected from the group consisting of aryloxy, arylthio, and iminoxy, and $n$ is at least two, at least two of the (NHCOX) groups being attached to aromatic nucleus carbon atoms in such positions that the aromatic nucleus has no substituents ortho- to an (NHCOX) group, said compound being present in said aqueous dispersion in the ratio of from about 0.5 gram mol to about 2.5 gram mols per 100 grams of said vulcanizable organic polymer.

References Cited in the file of this patent

UNITED STATES PATENTS

| | | |
|---|---|---|
| Re. 23,451 | Mighton | Jan. 15, 1952 |
| 2,439,514 | Herndon | Apr. 13, 1948 |
| 2,447,538 | Rust | Aug. 24, 1948 |
| 2,462,591 | Arundale | Feb. 22, 1949 |
| 2,570,895 | Wilson | Oct. 9, 1951 |
| 2,717,217 | Sullivan | Sept. 6, 1955 |

FOREIGN PATENTS

| | | |
|---|---|---|
| 150,416 | Australia | Mar. 5, 1953 |

OTHER REFERENCES

Rinne et al.: Article entitled "Effect of 2-Vinylpyridine on Properties of GR–S Polymers," appearing in the August 1948 edition of Industrial and Engineering Chemistry; pages 1437–1440 relied upon.